US009444336B2

United States Patent
Fukumoto

(10) Patent No.: US 9,444,336 B2
(45) Date of Patent: Sep. 13, 2016

(54) SWITCHING REGULATOR

(71) Applicant: Rohm Co., Ltd., Kyoto (JP)

(72) Inventor: Yosuke Fukumoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 14/674,250

(22) Filed: Mar. 31, 2015

(65) Prior Publication Data

US 2015/0280567 A1    Oct. 1, 2015

(30) Foreign Application Priority Data

Apr. 1, 2014    (JP) .................................. 2014-75483

(51) Int. Cl.
| | | |
|---|---|---|
| *H02M 3/156* | (2006.01) | |
| *H02M 3/158* | (2006.01) | |
| *H02M 1/00* | (2006.01) | |

(52) U.S. Cl.
CPC ........... *H02M 3/156* (2013.01); *H02M 3/1588* (2013.01); *H02M 2001/0025* (2013.01); *H02M 2001/0032* (2013.01)

(58) Field of Classification Search
CPC .... H02M 3/158; H02M 3/156; H02M 3/155; H02M 3/157; H02M 3/1563; G05F 1/569
USPC ........ 323/271, 276, 282, 283, 284, 285, 351
See application file for complete search history.

(56) References Cited

U.S. PATENT DOCUMENTS

| | | | |
|---|---|---|---|
| 7,019,507 B1 * | 3/2006 | Dittmer et al. ......... | H02M 1/32 323/271 |
| 2006/0164057 A1 * | 7/2006 | Kudo et al. ......... | H02M 3/1588 323/282 |
| 2007/0170904 A1 | 7/2007 | Hojo | |
| 2008/0061755 A1 * | 3/2008 | Michishita .......... | H02M 3/1588 323/282 |
| 2008/0231247 A1 | 9/2008 | Uehara | |
| 2009/0066305 A1 * | 3/2009 | Noda ................... | H02M 3/1588 323/282 |
| 2009/0201000 A1 * | 8/2009 | Kojima et al. ...... | H02M 3/1588 323/282 |
| 2009/0243577 A1 * | 10/2009 | Lim .................... | H02M 3/1588 323/283 |
| 2012/0056610 A1 | 3/2012 | Kimura | |
| 2012/0306466 A1 * | 12/2012 | Tabuchi et al. ....... | H02M 3/156 323/282 |

FOREIGN PATENT DOCUMENTS

| | | |
|---|---|---|
| JP | 2008-206239 | 9/2008 |
| JP | 2012-055129 | 3/2012 |
| JP | 2013-143831 | 7/2013 |
| WO | 2005/078910 | 8/2005 |

* cited by examiner

*Primary Examiner* — Adolf Berhane
(74) *Attorney, Agent, or Firm* — Fish & Richardson P.C.

(57) ABSTRACT

A switching regulator includes a load determination circuit. The load determination circuit feeds, to an offset voltage generation circuit, a different load determination signal at the time of light load or at the time of heavy load. The offset voltage generation circuit applies an offset voltage corresponding to whether a load is light or heavy to the inverting input terminal of a PWM comparator to acquire the responsiveness and the stability of the switching regulator.

8 Claims, 9 Drawing Sheets

SWITCHING REGULATOR

CROSS-REFERENCE TO RELATED APPLICATIONS

This application is based on Japanese Patent Application No. 2014-75483 filed in Japan on Apr. 1, 2014, the contents of which are hereby incorporated by reference.

BACKGROUND OF THE INVENTION

1. Field of the Invention

The present invention relates to a switching regulator, and more particularly to a switching regulator that can achieve both responsiveness and stability at the time of light load and at the time of heavy load.

2. Description of the Related Art

Switching regulators are used in various types of electronic devices. In the switching regulator, as compared with a linear regulator, power conversion efficiency can be enhanced whereas its noise resistance characteristic is often problematic. In the switching regulator, responsiveness and stability at the time of heavy load and at the time of light load are also often problematic.

Japanese Unexamined Patent Application Publication No. 2013-143831 discloses a switching regulator of a PWM control system, and a method of controlling it. This switching regulator includes a PWM comparator that compares the output voltage of an error amplifier with a slope voltage, and a first offset circuit and a second offset circuit that are formed with a constant current circuit are connected to the side of an input terminal to which the slope voltage is applied. In the configuration described above, at the time of heavy load, the first offset circuit is operated, and at the time of light load, both the offset circuits are operated, with the result that the operation point of the PWM comparator is adjusted.

Japanese Unexamined Patent Application Publication No. 2008-206239 provides a switching regulator in which when a load is rapidly reduced, even in a current mode system, an output voltage is not brought into an oscillation state, and thus the overshoot of the output voltage is reduced. In order to achieve its object, a circuit configuration is proposed in which an offset voltage is applied to the side of a terminal to which a so-called target voltage of an error amplifier is applied.

Japanese Unexamined Patent Application Publication No. 2012-55129 provides a switching regulator that reduces variations in output voltage. In order to achieve its object, a correction portion is provided that lowers a voltage input to an error amplifier to a predetermined value or less.

Domestic Re-publication of PCT International Publication No. 2005/078910 provides a switching power supply device that reduces loss at the time of light load to improve efficiency. It discloses a voltage source that applies an offset voltage to a current detection voltage obtained by detecting and converting a current value flowing through a coil into a voltage value.

SUMMARY OF THE INVENTION

The switching regulator of the present invention is related to the technical ideas disclosed in the patent documents described above, and in particular, an object of the present invention is to provide a switching regulator that can achieve both responsiveness and stability at the time of light load and at the time of heavy load.

In the present invention, an "offset" refers to a control method of intentionally producing a voltage difference between one input terminal and the other input terminal of a PWM comparator. An "offset voltage" refers to a differential voltage produced between the one input terminal and the other input terminal of the PWM comparator or a control signal for generating the differential voltage. An "offset voltage generation circuit" refers to a circuit that generates the offset voltage. A "slope voltage" refers to a voltage in a triangular or sawtooth shape that is generated in synchronization with a clock signal. A "slope comparison voltage" refers to a voltage obtained by adding the offset voltage to the slope voltage. A "slope voltage generation circuit" refers to a circuit that generate the slope voltage.

A switching regulator according to the present invention includes: a first switching transistor to which an input voltage is fed and which performs an on/off switching operation; a second switching transistor which performs an on/off operation complementarily with the first switching transistor; and a driver which generates a first drive pulse and a second drive pulse that respectively drive the first switching transistor and the second switching transistor in synchronization with a clock signal. The switching regulator further includes: a PWM comparator which adjusts the pulse width of the first drive pulse and the second drive pulse to feed a pulse width modulation signal to the driver; a reverse current detection circuit which detects a current flowing through the second switching transistor; a load determination circuit which is controlled by an output of the reverse current detection circuit; and an offset voltage generation circuit which is controlled by an output of the load determination circuit to correct a potential of one input terminal of the PWM comparator.

The other features, elements, steps, advantages and characteristics of the present invention will become obvious from the detailed description of the following preferred embodiments and the accompanying drawings related thereto.

DETAILED DESCRIPTION OF THE PREFERRED EMBODIMENTS

Figure 1:
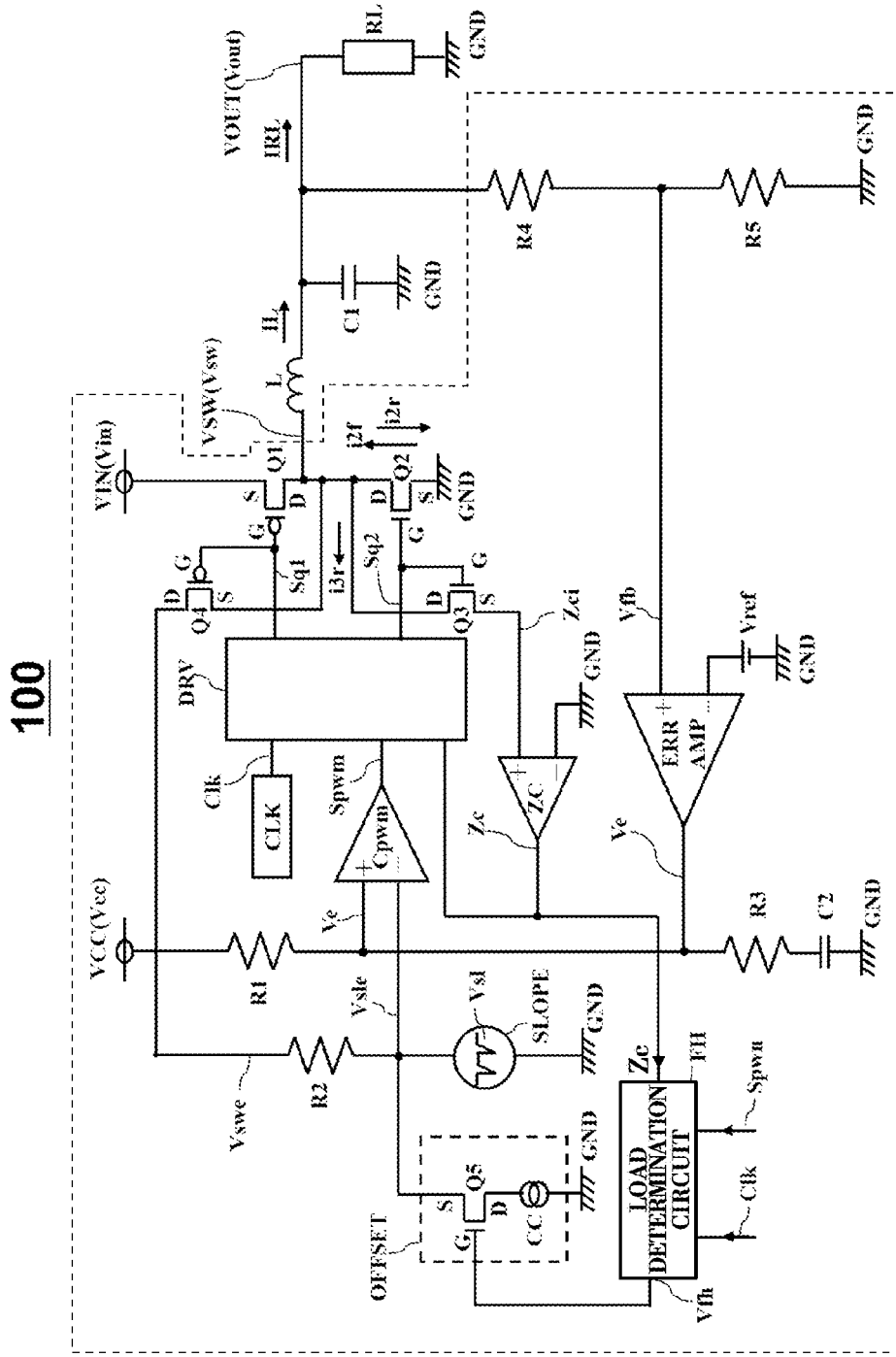
FIG. 1 A circuit diagram showing a switching regulator according to the present invention.

FIG. 1 is a circuit diagram showing a switching regulator according to the present invention. The switching regulator 100 forms a step-down switching regulator of a current mode system. The step-down switching regulator outputs, to an output terminal VOUT, an output voltage Vout lower than an input voltage Vin. The switching regulator 100 includes, as transistors, a first switching transistor Q1, a second switching transistor Q2, a reverse current detection transistor Q3, a switching signal feedback transistor Q4 and an offset transistor Q5.

The first switching transistor Q1 is formed with, for example, a p-channel MOS transistor, and the second switching transistor Q2 is formed with, for example, an n-channel MOS transistor. The first switching transistor Q1 and the second switching transistor Q2 perform a complementary switching operation. In other words, when the first switching transistor Q1 is on, the second switching transistor Q2 is off. On the other hand, when the second switching transistor Q2 is on, the first switching transistor Q1 is off. The second switching transistor Q2 is generally referred to as a synchronous rectifier transistor. In this type of switching regulator, a so-called dead time when both the transistors are not turned on simultaneously, that is, when both the transistors are turned off simultaneously is generally set.

The first switching transistor Q1 and the second switching transistor Q2 are connected in series to each other between an input terminal VIN and a ground voltage GND, and the input voltage Vin is fed to the input terminal VIN. A common connection point of the first switching transistor Q1 and the second switching transistor Q2 is prepared as a switching output terminal VSW through which a switching output signal Vs is output. An inductor L and a capacitor C1 are connected in series to the switching output terminal VSW and the ground voltage GND, and their common connection point is prepared as the output terminal VOUT through which the output voltage Vout is output. A load RL is coupled to the output terminal VOUT, and the output voltage Vout is fed to the load RL. The load RL collectively represents various types of electronic circuits. A load current IRL flows through the load RL. The magnitude of the load current IRL varies according to the state of the operation of the load RL, that is, whether the load RL is light or heavy. At the time of light load, the load current IRL is decreased whereas at the time of heavy load, the load current IRL is increased.

Resistors R4 and R5 are connected in series to each other between the output terminal VOUT and the ground voltage GND. The resistors R4 and R5 form a voltage-dividing circuit that divides the output voltage Vout output to the output terminal VOUT, and applies the divided voltage as a feedback voltage Vfb to, for example, the non-inverting input terminal of an error amplifier ERRAMP. A reference voltage Vref is applied to the inverting input terminal of the error amplifier ERRAMP, the feedback voltage Vfb is compared with the reference voltage Vref and the result of the comparison is output as an error voltage Ve from the error amplifier ERRAMP.

The output of the error amplifier ERRAMP is coupled to the common connection point of resistors R1 and R3 to which the resistors R1 and R3 and a capacitor C2 are connected in series. The resistor R1 is prepared to convert an output current output from the error amplifier ERRAMP into a voltage with reference to a power supply voltage Vcc at a power supply terminal VCC, and the converted error voltage Ve is applied to the non-inverting input terminal of a PWM comparator Cpwm. The resistors R1 and R3 and the capacitor C2 determine the gain of the error amplifier ERRAMP and act to perform phase compensation, and also function as an error voltage application means to apply the error voltage Ve to the non-inverting input terminal of the PWM comparator Cpwm.

The phase compensation is performed so that a difference, that is, a phase margin with respect to a so-called phase lag of 180 degrees in the switching regulator 100 is enhanced. When it is assumed that the phase when the loop gain of the switching regulator 100 is 0 db (gain one time) is, for example, 120 degrees, the phase margin can be represented by 60 degrees=180 degrees−120 degrees. It is also said that when this phase margin is 45 degrees or more, the phase margin is sufficient. A loop gain difference with respect to the gain of 0 db when the phase lag is 180 degrees is referred to as a "gain margin." For example, when the loop gain with a phase lag of 180 degrees is −20 db, the gain margin is 20 db.

The magnitude of the error voltage Ve varies according to whether the load RL is light or heavy. In general, the time of light load" indicates that the load current IRL fed to the load RL is low with respect to a rated supply current, and particularly indicates a region around the start of a supply current including the time of no load when the load current IRL is substantially zero. On the other hand, the time of heavy load indicates a region of the load current around the rated supply current. In the present invention, without deviating from the definition described above, in order to further clarify the definition of whether the load is light or heavy, the reverse flow of the current into the second switching transistor Q2 with respect to the original current path, that is, the state of the operation when the reverse current is detected is defined as the time of light load. The forward current of the second switching transistor Q2 is represented by symbol i2f, and the reverse current flowing in the reverse direction is represented by symbol i2r.

When the load RL is relatively heavy, since the output voltage Vout of the output terminal VOUT is lowered, and the feedback voltage Vfb is lowered as compared with the reference voltage Vref, the error voltage Ve is increased. On the other hand, when the load RL is relatively light, since the output voltage Vout of the output terminal VOUT is increased, and the feedback voltage Vfb is increased as compared with the reference voltage Vref, the magnitude of the error voltage Ve is increased.

A slope voltage Vsl is generated in a slope voltage generation circuit SLOPE. The slope voltage generation circuit SLOPE synchronizes with a clock signal Clk generated in a clock signal generation circuit CLK, charges and discharges an unillustrated capacitor with a constant current circuit, a resistor and the like which are not illustrated and thereby generates a sloped voltage in a triangular or sawtooth shape.

On the slope voltage Vsl, the amount of change in a switching output signal Vsw generated when the first switching transistor Q1 is turned on is superimposed through the switching signal feedback transistor Q4 and the resistor R2. A p-channel MOS transistor is used so that the switching signal feedback transistor Q4 is turned on and off in synchronization with the first switching transistor Q1. The magnitude of the switching output signal Vsw varies according to an on-resistance value when the first switching transistor Q1 is turned on. In other words, when the on-resistance of the first switching transistor Q1 is increased, the amplitude of the switching output signal Vsw is decreased. Furthermore, as the current flowing through the first switching transistor Q1 is increased, the amplitude of the switching output signal Vsw is decreased. Hence, the amount of change in the switching output signal Vsw is fed back and added to the slope voltage Vsl, thereby the current flowing through the first switching transistor Q1 is detected and its magnitude is fed back to the PWM comparator Cpwm. Hence, the switching regulator 100 shown in FIG. 1 can be said to be the current mode system.

A slope comparison voltage Vsle is a signal in which a monitoring voltage Vswe is superimposed on the slope voltage Vsl through the resistor R2. The monitoring voltage Vswe is a voltage that is obtained by taking the switching output signal Vsw out to the drain D of the switching signal feedback transistor Q4. The monitoring voltage Vswe is applied through the resistor R2 to the inverting input terminal of the PWM comparator Cpwm.

The slope comparison voltage Vsle in which the monitoring voltage Vswe of the switching output signal Vsw is superimposed on the slope voltage Vsl is applied to the inverting input terminal of the PWM comparator Cpwm. The error voltage Ve is applied to the non-inverting input terminal of the PWM comparator Cpwm, When the error voltage Ve is higher than a slope voltage Vsel, the PWM comparator Cpwm is adjusted such that the pulse width of a PWM output signal Spwm is increased whereas when the error voltage Ve is lower than the slope voltage Vsel, the PWM comparator Cpwm is adjusted such that the pulse width of the PWM output signal Spwm is decreased. The PWM output signal Spwm is applied to a driver DRV.

The magnitudes of voltages at the non-inverting input terminal and the inverting input terminal of the PWM comparator Cpwm are determined based on the magnitudes of the resistance values of the resistors R1 and R3 and the power supply voltage Vcc at the power supply terminal VCC.

The driver DRV generates a first drive pulse Sq1 and a second drive pulse Sq2 that respectively drive the first switching transistor Q1 and the second switching transistor Q2. In other words, the driver DRV generates the first drive pulse Sq1 and the second drive pulse Sq2 whose duty ratios are adjusted based the clock signal Clk generated in the clock signal generation circuit CLK and the PWM output signal Spwm output from the PWM comparator Cpwm.

The first drive pulse Sq1 and the second drive pulse Sq2 are respectively set to such polarities that the first switching transistor Q1 and the second switching transistor Q2 are complementarily turned on and off. For example, when the first switching transistor Q1 is a p-channel MOS transistor, and the second switching transistor Q2 is an n-channel MOS transistor, the first drive pulse Sq1 and the second drive pulse Sq2 are set to the same polarity.

In general, in order to generate the first drive pulse Sq1 and the second drive pulse Sq2, the driver DRV incorporates a flip-flop, a dead time generation circuit and the like that are not illustrated. The dead time generation circuit is often adopted in this type of switching regulator. In other words, a section where the first switching transistor Q1 and the second switching transistor Q2 are not simultaneously turned on, that is, a period during which both the transistors are simultaneously turned off, is often provided.

A load determination circuit FH is prepared as one of the features of the present invention. Although the load determination circuit FH will be described in detail later, here, its circuit configuration will be described briefly. The load determination circuit FH is formed with a logic circuit such as a counter and a latch circuit. The PWM output signal Spwm, the clock signal Clk and a reverse current detection signal Zc output from a reverse current detection circuit ZC are applied to the load determination circuit FH. The reverse current detection signal Zc is mainly used to reset the counter.

An offset voltage generation circuit OFFSET is formed with, for example, the offset transistor Q5 formed with an n-channel MOS transistor and a constant current circuit CC. The offset transistor Q5 is turned on when a load determination signal Vfh output from the load determination circuit FH is high whereas the offset transistor Q5 is turned off when the load determination signal Vfh is low. When the offset transistor Q5 is turned on, a current whose magnitude is substantially the same as a constant current generated in the constant current circuit CC flows from the power supply terminal VCC through the resistor R2 from the drain D to the source S of the offset transistor Q5. When the offset transistor Q5 is turned on, the direct-current potential of the inverting input terminal (−) of the PWM comparator Cpwm to which the slope comparison voltage Vsle is applied is lowered. Here, a differential voltage is produced between the non-inverting input terminal (+) and the inverting input terminal (−) of the PWM comparator Cpwm, and simultaneously the differential voltage between both the input terminals is corrected. The correction described above is offset, and the differential voltage applied at this time is an offset voltage.

It is not a necessary condition that the offset transistor Q5 of the offset voltage generation circuit OFFSET is turned on at the time of light load. In other words, there can be a choice of turning off the offset transistor Q5 at the time of light load, and there can be a choice of turning on or off the offset transistor Q5 at the time of heavy load. The selection of the choices described above is changed depending on, for example, the voltage applied to the two input terminals of the PWM comparator Cpwm and the circuit configuration of the slope voltage generation circuit SLOPE generating the slope voltage Vsl.

Constituent elements surrounded by broken lines in FIG. 1 are preferably formed into an IC. However, the resistors R4 and R5 may be connected externally to the IC.

FIGS. 2A to 2G are timing charts of signals at main nodes of the switching regulator 100 shown in FIG. 1 and according to the present invention. FIGS. 2A to 2F show signal waveforms at the time of heavy load, and FIG. 2G show signal waveforms both at the time of heavy load and at the time of light load. The signal waveforms of FIGS. 2A to 2G will be briefly described below with reference to FIG. 1.

FIG. 2A shows the clock signal Clk generated in the clock signal generation circuit CLK. The circuit operation of the driver DRV is synchronized with the clock signal Clk. The circuit operation of the switching regulator 100 is also operated in synchronization with the clock signal Clk. The frequency of the clock signal Clk is selected from, for example, 200 kHz to 6 MHz. The clock signal Clk can also be said to be a reference signal when the switching regulator 100 is operated.

FIG. 2B shows the first drive pulse Sq1 and the second drive pulse Sq2, these drive pulses Sq1 and Sq2 are respectively applied to the gates G of the first switching transistor Q1 and the second switching transistor Q2 and these transistors are complimentarily turned on and off. The first drive pulse Sq1 and the second drive pulse Sq2 are synchronized with the clock signal Clk and are output from the driver DRV. When the first switching transistor Q1 is, for example, a p-channel MOS transistor, and the second switching transistor Q2 is, for example, an n-channel MOS transistor, the polarities of the first drive pulse Sq1 and the second drive pulse Sq2 are set equal to each other.

FIG. 2C shows the switching output signal Vsw output to the switching output terminal VSW, that is, the drain D of the first switching transistor Q1 and the second switching transistor Q2. The signal waveform of the switching output signal Vsw is inverted with respect to the polarities of the first drive pulse Sq1 and the second drive pulse Sq2.

FIG. 2D shows an inductor current IL flowing through the inductor L. The inductor current IL is synchronized with the switching output signal Vsw at the time of heavy load, and is formed in a substantially triangular shape.

FIG. 2E schematically shows the error voltage Ve that is an output of the error amplifier ERRAMP, the slope comparison voltage Vsle that is applied to the inverting input terminal of the PWM comparator Cpwm and the monitoring voltage Vswe that is output to the drain D of the switching signal feedback transistor Q4.

FIG. 2F shows the PWM output signal Spwm that is output from the PWM comparator Cpwm. The PWM output signal Spwm is an output signal from the PWM comparator Cpwm, and is a comparison result signal between the error voltage Ve and the slope comparison voltage Vsle. The pulse width Wpwm of the PWM output signal Spwm is controlled according to whether the load is light or heavy.

FIG. 2G shows the reverse current detection signal Zc output from the reverse current detection circuit ZC. The reverse current detection signal Zc is set such that the reverse current detection signal Zc is turned high Hi at the time of light load, that is, when a reverse current i2r flows through the second switching transistor Q2 whereas the reverse current detection signal Zc is turned low Lo at the time of heavy load, that is, when the reverse current i2r does not flow therethrough. When the reverse current detection signal Zc is high Hi, the second drive pulse Sq2 is controlled such that the second switching transistor Q2 is latched in an off state.

FIGS. 3A to 3D show timing charts of the signal waveforms at the main nodes in FIG. 1 at the time of light load. FIG. 3A shows the switching output signal Vsw output to the switching output terminal VSW. The switching output signal Vsw is placed in the highest level in a period from time t1 to time t2 and is placed at a minus potential that is lower than zero volts which are a ground potential GND in a period from time t2 to time t3. The switching output signal Vsw is placed in an intermediate level Mi in a period from time t3 to time t4 and is placed again in the highest level in a period from time t4 to time t5. In the period from time t3 to time t4, the reverse current detection circuit ZC detects the flow of the reverse current i2r through the second switching transistor Q2 to detect the state of light load, the switching output signal Vsw is held in the intermediate level Mi and both the first switching transistor Q1 and the second switching transistor Q2 are placed in the off state.

FIG. 3B shows the reverse current detection signal Zc of the reverse current detection circuit ZC. It shows that the reverse current detection signal Zc is low Lo in the period from time t1 to time t3, is high Hi in the period from time t3 to time t4 and is low Lo again in the period from time t4 to time t6. The fact that the reverse current detection signal Zc is low Lo indicates that the reverse current detection circuit ZC is not operated, that is, that a current i2f in a normal current path flows through the second switching transistor Q2 and the reverse current i2r does not flow therethrough. The period from time t3 to time t4 during which the reverse current detection signal Zc is high Hi is a period during which the reverse current detection circuit ZC is operated.

FIGS. 3C and 3D show the first drive pulse Sq1 and the second drive pulse Sq2, respectively. The first drive pulse Sq1 is placed in the low level Lo in the period from time t1 to time t2 and in the period from time t4 to time t5, and is placed in the high level Hi in the period from time t2 to time t4. The second drive pulse Sq2 is placed in the high level Hi in the period from time t2 to time t3 and in the period from time t5 to time t6, and is placed in the low level Lo in the period from time t1 to time t2 and in the period form time t3 to time t5.

It is found from FIGS. 3A to 3D that the switching output signal Vsw is high Hi when the first drive pulse Sq1 is low Lo, and that the switching output signal Vsw is in a minus level when the second drive pulse Sq2 is high Hi. Then, in the period from time t3 to time t4 during which the first drive pulse Sq1 is high Hi and the second drive pulse Sq2 is low Lo, the switching output signal Vsw is in the intermediate level Mi. Furthermore, in the period from time t3 to time t4, that is, in the period during which the reverse current detection signal Zc is high Hi, the switching output signal Vsw is placed in the intermediate level Mi. In the period from time t3 to time t4, both the first switching transistor Q1 and the second switching transistor Q2 are placed in the off state. Hence, in the period from time t3 to time t4, the switching output terminal VSW through which the switching output signal Vsw is output is placed in a high impedance state. Although a circuit portion that turns off both the first switching transistor Q1 and the second switching transistor Q2 is not illustrated, it is incorporated in the driver DRV.

The following is further found from FIGS. 3A to 3D. Specifically, as is found from a transition state of the reverse current detection signal Zc in the period from time t3 to time t6, the reverse current detection signal Zc is high until the period from time t3 to time t4. When the time is transferred to the period from time t4 to time t5, the switching signal Vsw is turned high again, and the reverse current detection circuit ZC is turned from on to off, with the result that a so-called light load detection state is temporarily reset. The period during which the light load detection state is reset is continued until the second drive pulse Sq2 controlling the second switching transistor Q2 is kept high Hi.

Figure 4:
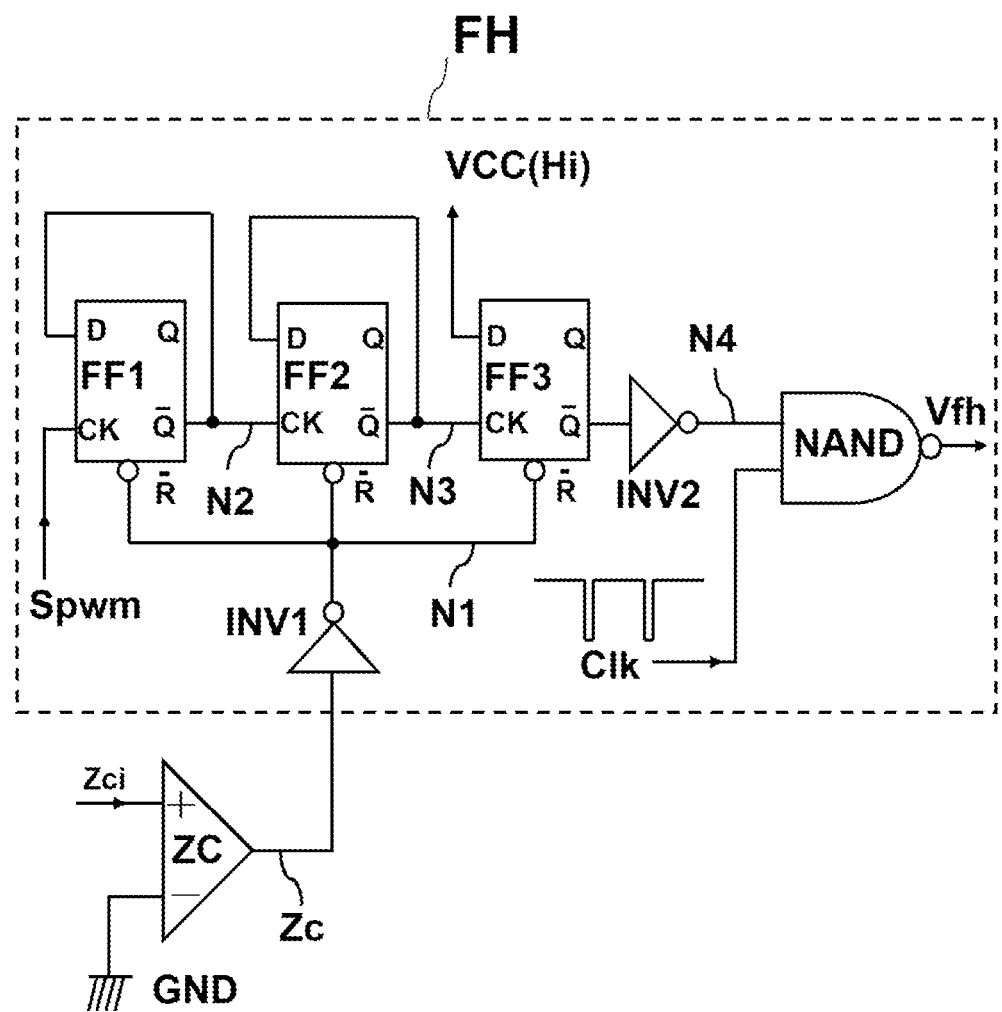
FIG. 4 A circuit diagram showing an example of a load determination circuit according to the present invention.

FIG. 4 shows an example of the load determination circuit FH according to the present invention. The load determination circuit FH uses the PWM output signal Spwm, the reverse current detection signal Zc output from the reverse current detection circuit ZC and the clock signal Clk to perform a logic operation, and determines, based on the result of the logic operation, whether the load is the light load or the heavy load. Although the determination of whether the load is the light load or the heavy load has already been made by the reverse current detection circuit ZC before the load determination circuit FH makes the determination, the load determination circuit FH finally determines which of the two states the load is in.

FIG. 4 shows the example where the D input terminal of a flip-flop FF3 is fixed to, for example, the power supply terminal VCC, that is, the high level Hi. The level setting of the D input terminal is determined by whether the levels taken out to the Q output and the Q bar output of the flip-flop FF3 are set high or low. Without flip-flops FF1 and FF2 being prepared, the PWM output signal Spwm may be directly latched by the flip-flop FF3. In this case, a margin time when the time of light load is switched to the time of heavy load is zero, and thus it is possible to reduce a time necessary for the offset voltage generation circuit OFFSET to perform switching when the load state is switched. However, when the margin time is set at zero, the sensitivity of the switching between the time of light load and the time of heavy load is increased, with the result that the offset voltage generation circuit OFFSET may be operated without the load state being sufficiently fixed. Whatever the case may be, the setting of the margin time when the load is switched is preferably determined with consideration given to the frequency of the clock signal Clk, the size of the load RL and the circuit function.

Figure 2:
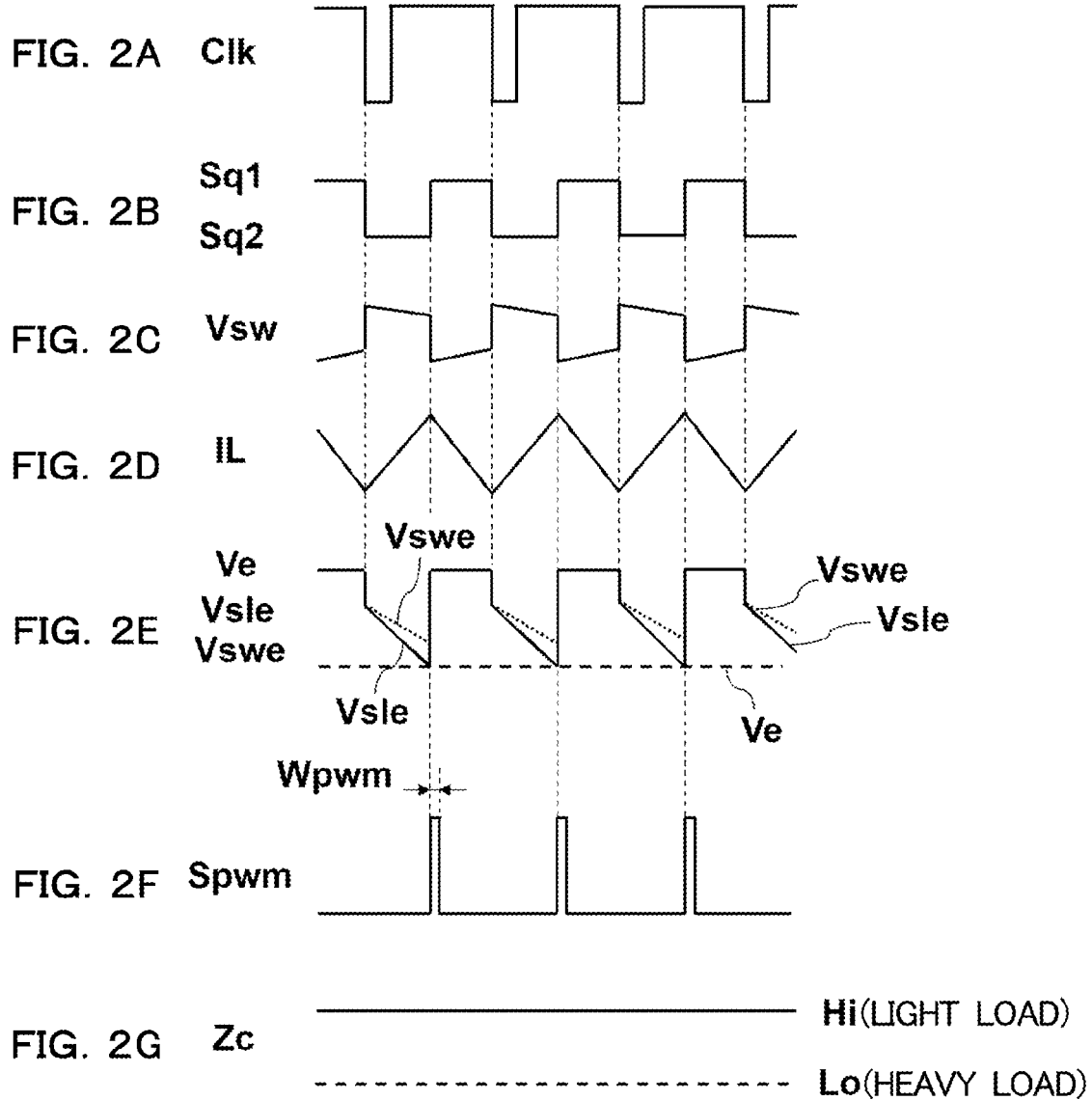
FIGS. 2A to 2G Timing charts of signal waveforms at main nodes of a circuit diagram shown in FIG. 1.
Figure 3:
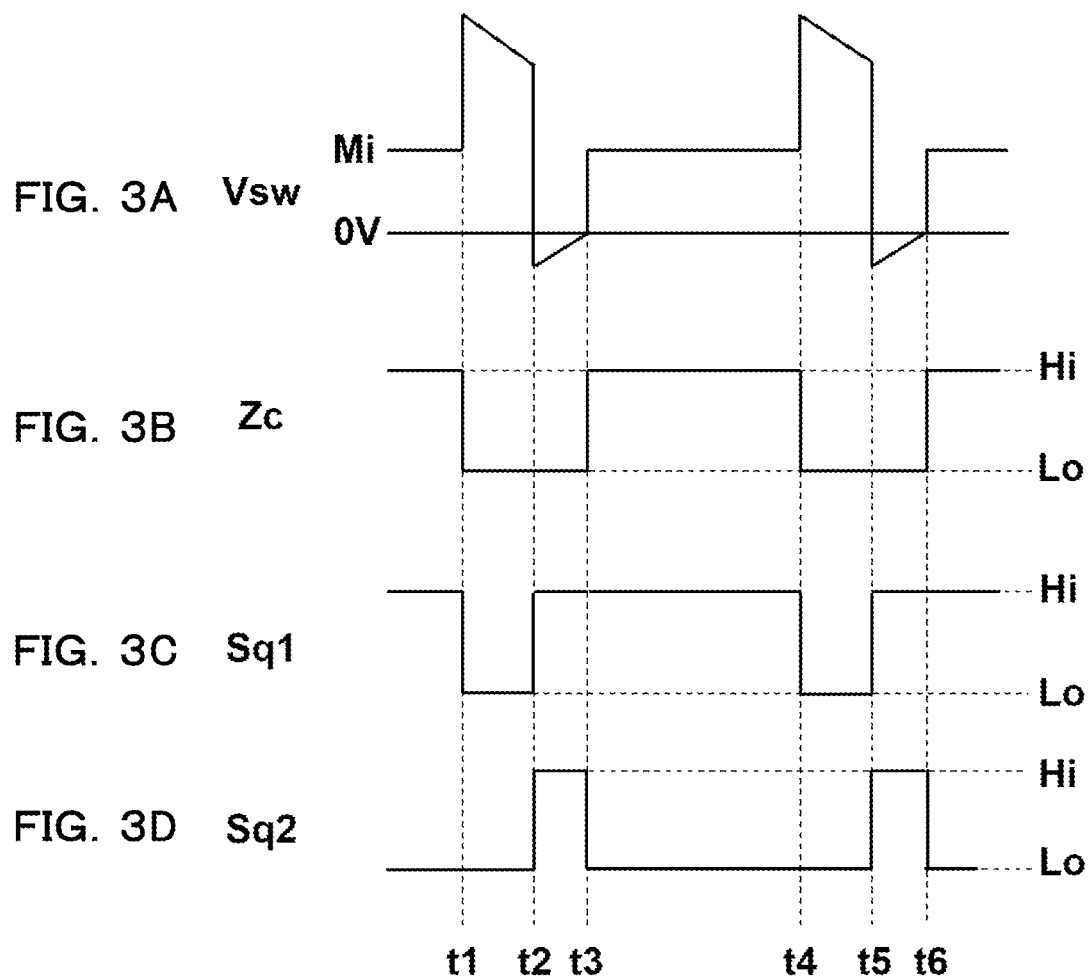
FIGS. 3A to 3D Timing charts of signal waveforms at main nodes of the switching regulator shown in FIG. 1 at the time of light load.

The load determination circuit FH shown in FIG. 4 will be described with reference to FIGS. 1 to 3. As previously described, the purpose of providing the load determination circuit FH is to reliably determine in which one of the state of the time of light load and the state of the time of heavy load the switching regulator 100 is operated. The purpose of preparing the load determination circuit FH is also to detect, when the load state is changed from the light load to the heavy load or from the heavy load to the light load, the timing at which such transition is performed, to correct the circuit operation point of the PWM comparator Cpwm, to reduce a decrease in responsiveness at the time of light load and to acquire, in particular, the stability of the output voltage Vout at the time of heavy load.

The load determination circuit FH is formed with various types of logic circuits such as the first flip-flop FF1, the second flip-flop FF2, the third flip-flop FF3, inverters INV1 and INV2 and a NAND circuit NAND. The logic circuit used in the load determination circuit FH according to the present invention is not limited to the NAND circuit NAND. For example, the logic circuit can be formed by combination of a NOR circuit NOR, an OR circuit OR, an AND circuit AND and a NOT circuit NOT (inverter). The NAND circuit NAND can also be formed with a NOR circuit NOR, an OR circuit OR and the like according to the polarity of a signal output to a node N4 or the polarity of the clock signal Clk. The above-described selection and combination of such logic circuits are relatively easily performed by the person skilled in the art, and can be said to be one of design matters.

The flip-flops FF1 to FF3 are formed with a D flip-flop. The PWM output signal Spwm is applied to an input terminal CK of the flip-flop FF1. The period of the PWM output signal Spwm differs between the time of light load and the time of heavy load. Hence, the detection of the period of the PWM output signal Spwm leads to the understanding of the load state. The PWM output signal Spwm is a pulse width modulation signal that is output from the PWM comparator Cpwm and is applied to the driver DRV. The flip-flops FF1 and FF2 serves both as a frequency divider and as a counter that count the number of PWM output signals Spwm. The flip-flop FF3 latches the number of PWM output signals Spwm counted by the flip-flops FF1 and FF2. Although the flip-flops FF1 and FF2 are not necessary constituent elements, the flip-flop FF3 is prepared to latch the PWM output signal Spwm. Hence, it is sufficient to prepare at least one stage of flip-flop in the load determination circuit FH. The number of stages of the flip-flops FF1 and FF2 is determined based on about how long it takes to perform switching at the time of transition from the light load to the heavy load or at the time of transition from the heavy load to the light load. In other words, it is determined based on the margin time when the load is switched. If the load determination circuit FH is formed with only the flip-flop FF3 without preparation of the flip-flops FF1 and FF2, the time necessary to switch from the light load to the heavy load or from the heavy load to the light load is zero in a logic operation.

When the time necessary to acquire the responsiveness and stability for variations in the weight of the load, that is, the margin time, is set relatively short, a failure occurs in which it is impossible to reliably recognize whether the load state is the heavy load state or the light load state. When the time necessary to switch the load is set relatively long, a failure occurs in which the responsiveness is slow. Hence, when the margin time is set, if the frequency of the signal Clk is set at, for example, 1 MHz, and the time taken to perform the switching is set at a time corresponding to four clock signals Clk, the time necessary to switch the load is about 4 µs. If the load determination circuit FH is formed with three stages or four stages of flip-flops FF1 and FF2 instead of two stages, the time necessary to perform the switching is 8 µs or 16 µs, respectively.

The load determination circuit FH includes the inverters INV1 and INV2. These inverters are not necessary constituent elements. The inverter INV1 is prepared for equalizing the polarities of reset signals applied to the R bar terminals of the flip-flops FF1 to FF3, and the inverter INV2 is prepared for equalizing the polarities to determine whether the offset transistor Q5 of the offset voltage generation circuit OFFSET is turned on in the high level or is turned on in the low level.

The reverse current detection signal Zc output from the reverse current detection circuit ZC is applied to the input side of the inverter INV1. A reverse current detection input signal Zci detected by the reverse current detection transistor Q3 is applied to the non-inverting input terminal of the reverse current detection circuit ZC. With the timing at which the reverse current detection signal Zc is changed from low Lo to high Hi, the load determination circuit FH counts the PWM output signal Spwm.

When the load determination signal Vfh is output from the output side of the load determination circuit FH, that is, the NAND circuit NAND, the offset transistor Q5 of the offset voltage generation circuit OFFSET is placed in the on state or the off state. The load determination signal Vfh falls within a range of the offset voltage defined in the present invention.

When the offset transistor Q5 of the offset voltage generation circuit OFFSET is turned on, the constant current circuit CC is also turned on, and the direct-current potential of the inverting input terminal of the PWM comparator Cpwm is corrected to be lower than a potential when the offset transistor Q5 is off.

FIGS. 5A to 5D show timing charts of the signal waveforms at main nodes when a switching regulator examined for inventing the switching regulator 100 shown in FIG. 1 is operated under the heavy load. When the outline of the circuit examined is described, the circuit configuration is as follows: in FIG. 1, the load determination circuit FH is not adopted, the offset voltage generation circuit OFFSET is adopted and the clock signal Clk is applied to the gate G of the offset transistor Q5. Hence, this remains the same as in the embodiment of the present invention in that in the circuit configuration, the offset voltage is applied to the PWM comparator Cpwm. FIGS. 5A to 5D will be briefly described below.

Figure 5:
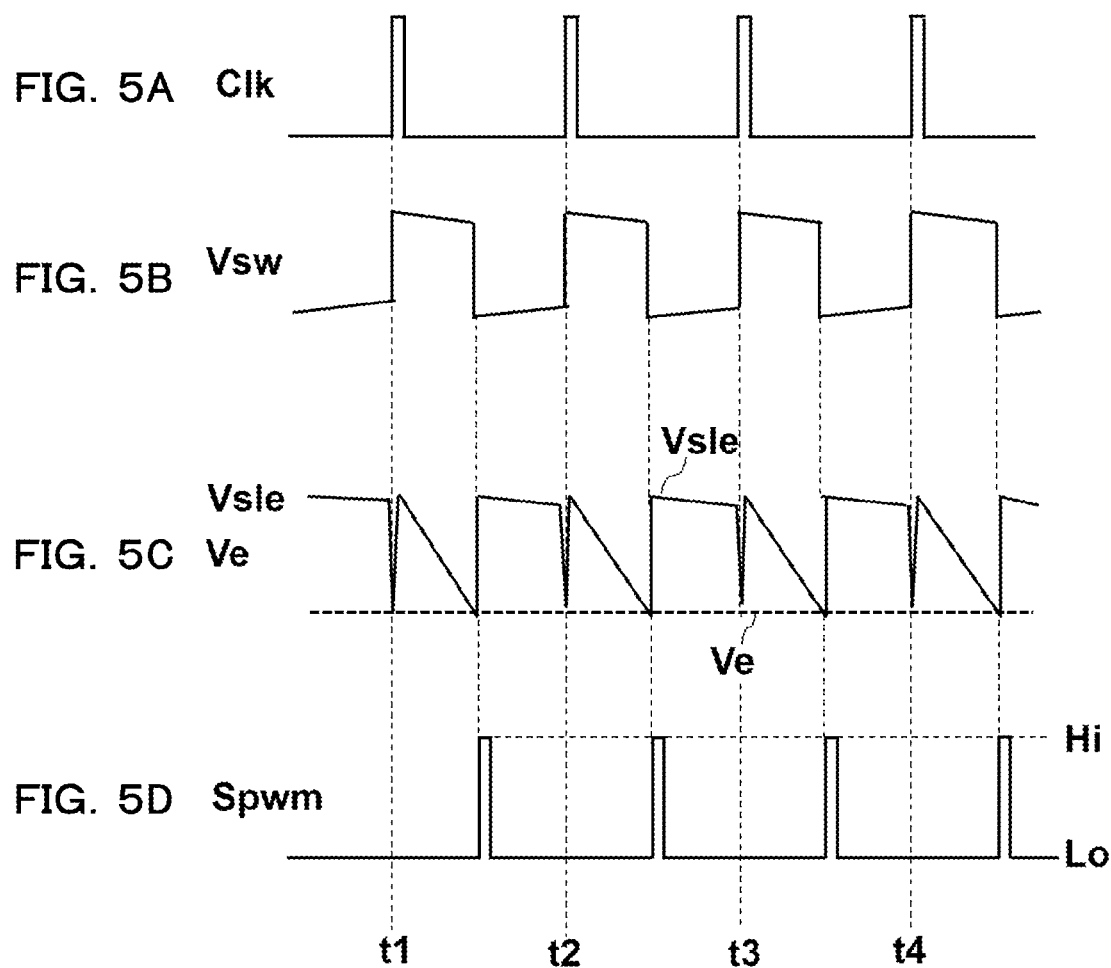
FIGS. 5A to 5D Timing charts of signal waveforms at main nodes of a circuit examined for inventing the switching regulator shown in FIG. 1.
Figure 6:
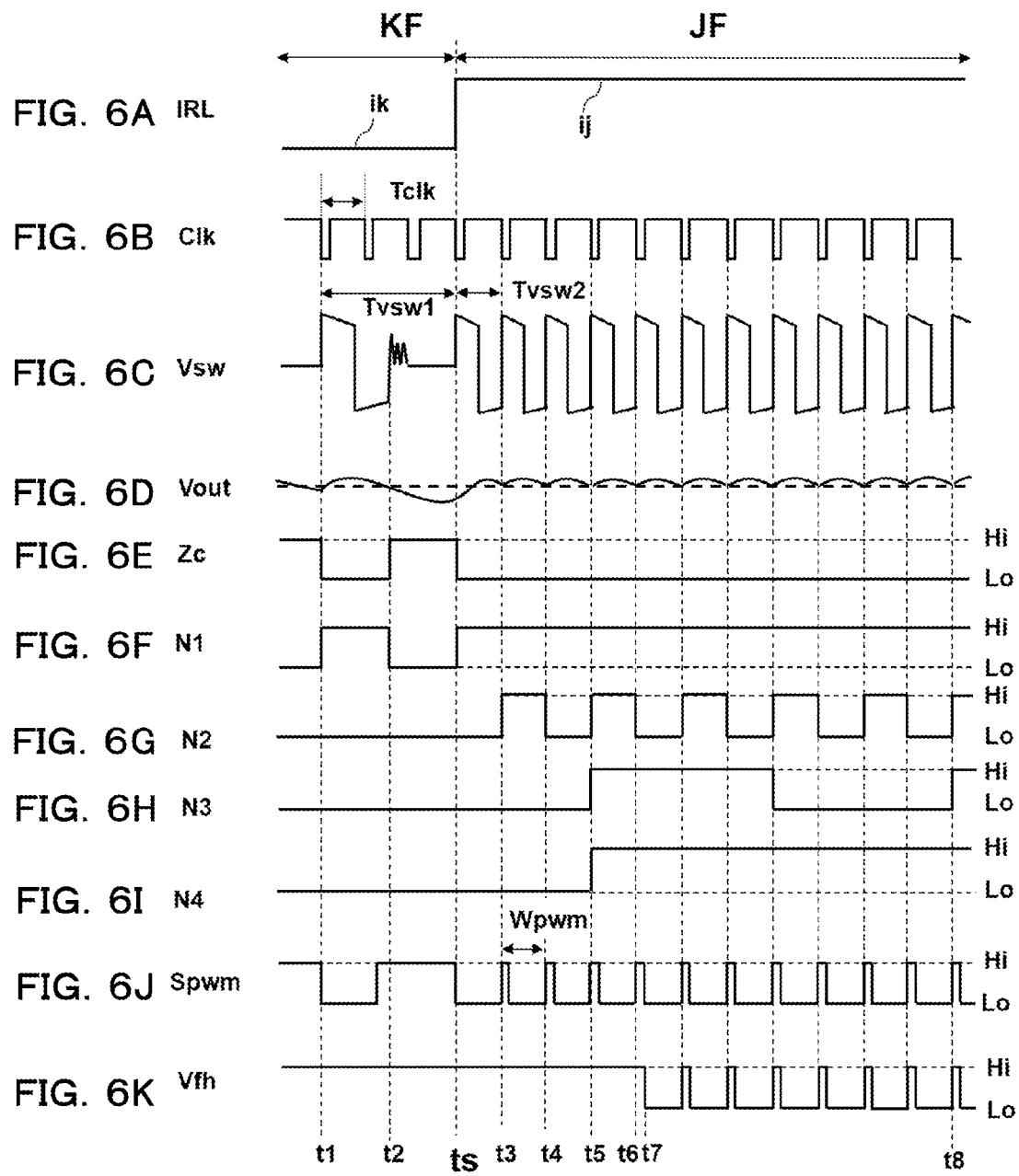
FIGS. 6A to 6K Timing charts of signal waveforms at main nodes when the switching regulator shown in FIG. 1 is switched from the time of light load to the time of heavy load.
Figure 7:
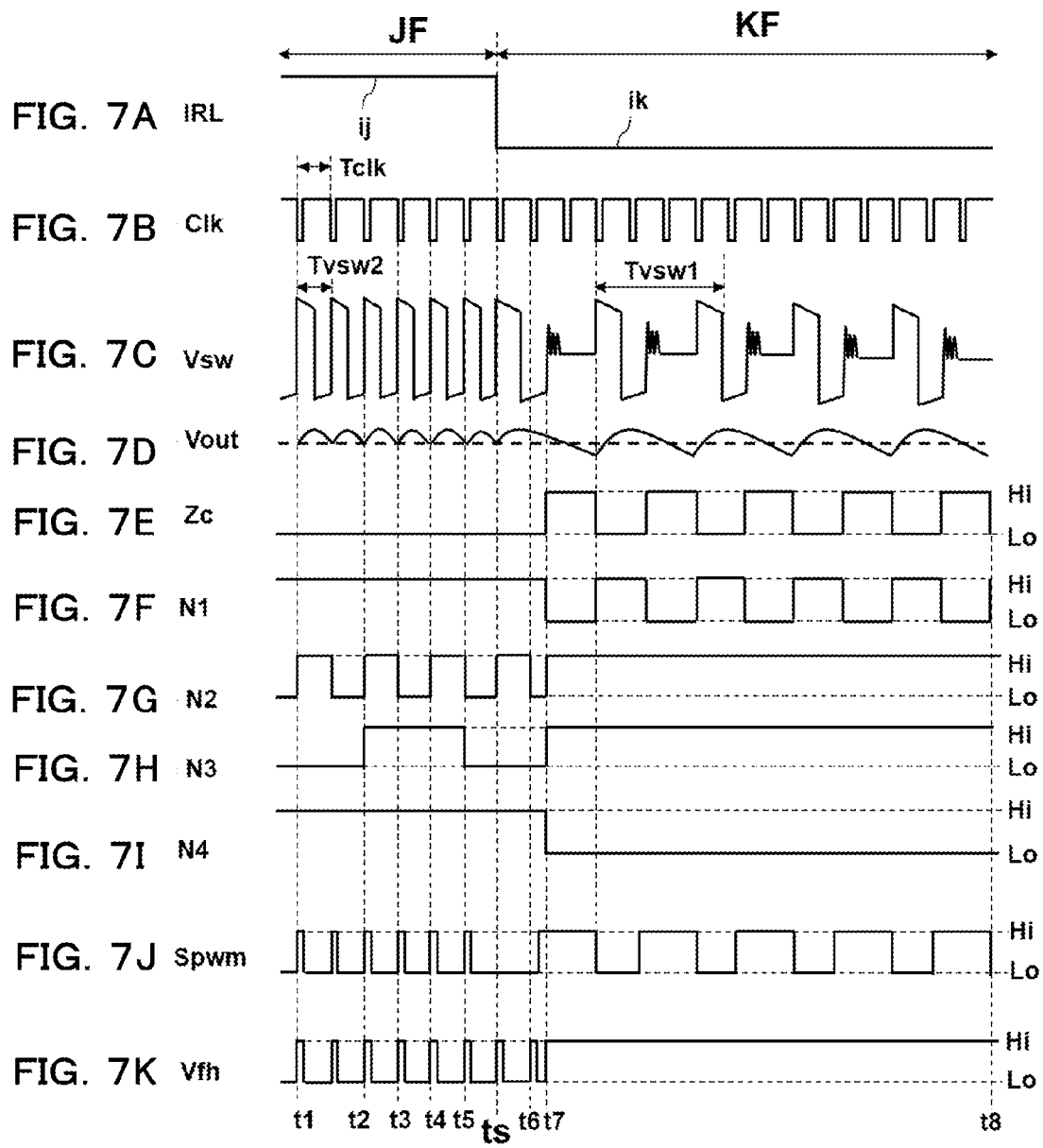
FIGS. 7A to 7K Timing charts of signal waveforms at main nodes when the switching regulator shown in FIG. 1 is switched from the time of heavy load to the time of light load.

FIG. 5A shows the clock signal Clk. The clock signal Clk is generated in the clock signal generation circuit CLK. The switching regulator 100 is operated in synchronization with the clock signal Clk. As the frequency of the clock signal Clk is increased (higher), the speed of the operation of the switching regulator 100 is increased. The frequency of the clock signal Clk is set within a range of, for example, 200 kHz to 6 MHz. In the embodiment of the present invention, the frequency of the clock signal Clk is 1 MHz.

FIG. 5B shows the switching output signal Vsw. The switching output signal Vsw is output to the drain D of the first switching transistor Q1 and the second switching transistor Q2 shown in FIG. 1. At the time of heavy load, the period of the switching output signal Vsw is equal to that of the clock signal Clk.

FIG. 5C shows the error voltage Ve applied to the non-inverting input terminal of the PWM comparator Cpwm shown in FIG. 1 and the slope comparison voltage Vsle applied to the inverting input terminal. It is shown that the error voltage Ve is in substantially the same level regardless of times t1 to t4. It is shown that the amplitude of the slope comparison voltage Vsle is rapidly lowered in periods during which the clock signal Clk is applied with the timing of times t1, t2, t3 and t4. This is because control is performed such that the offset transistor Q5 and the constant current circuit CC of the offset voltage generation circuit OFFSET shown in FIG. 1 are operated and that the direct-current potential of the inverting input terminal of the PWM comparator Cpwm is lowered. This type of control is performed because the offset voltage is applied to the PWM comparator Cpwm in a period during which the clock signal Clk enters the PWM comparator Cpwm, the slew rate of the rising edge of the switching output signal Vsw shown in FIG. 5B is increased and thus the occurrence of noise is reduced. Although in the embodiment of the present invention, the control is performed such that the direct-current potential of the inverting input terminal of the PWM comparator Cpwm is lowered, there is no restriction on this control method. In other words, a method of performing control such that the direct-current potential of the inverting input terminal of the PWM comparator Cpwm is increased is also possible. This type of control method is changed depending on the circuit configuration of the offset voltage generation circuit OFFSET and its control method. A method of performing control such that instead of the inverting input terminal of the PWM comparator Cpwm, the offset voltage is applied to the non-inverting input terminal is also possible. A method of performing control such that two stages of constant current circuits CC are provided in parallel instead of one stage, and that these constant current circuits are switched at the time of light load and at the time of heavy load is also possible. Moreover, the person skilled in the art can conceive various types of ideas on various types of signals applied to the two input terminal sides of the PWM comparator Cpwm and its control method.

FIG. 5D shows the PWM output signal Spwm output to the PWM comparator Cpwm. The pulse width of the PWM output signal Spwm is controlled according to whether the load RL is light or heavy. The PWM output signal Spwm is output according to the difference in the voltage level between the error voltage Ve and the slope comparison voltage Vsle shown in FIG. 5C, and for example, the error voltage Ve is turned high Hi in a level in which the error voltage Ve is higher than the slope comparison voltage Vsle whereas the error voltage Ve is turned low Lo in a level in which the slope comparison voltage Vsle is higher than the error voltage Ve.

As described with reference to FIGS. 5A to 5D, it is found that the application of the offset voltage to the PWM comparator Cpwm by utilization of the clock signal Clk at the time of heavy load has the effect of reducing the occurrence of noise. However, since it is found that it is not always sufficient to use only this type of control method at the time of heavy load and at the time of light load, a description will be given of such a point.

FIGS. 6A to 6K show the results of a simulation on the signal waveforms at the main nodes of the switching regulator 100 shown in FIG. 1 and according to the present invention and the load determination circuit FH shown in FIG. 4. FIGS. 6A to 6K are broadly divided into two regions. Specifically, with time ts being a boundary, the region at the time of light load is represented by a symbol KF, and the region at the time of heavy load is represented by a symbol JF. FIGS. 6A to 6K will be described below with reference to FIGS. 1 and 4.

FIG. 6A shows the load current IRL used to distinguish between the time of light load KF and the time of heavy load JF. The load current IRL is represented by a current ik at times t1, t2 and ts, and is represented by a current ij at times ts, t3, t4, t5, t6, t7 and t8. On the simulation, it is assumed that the current ik is zero, and that the current ij is 500 mA.

FIG. 6B shows the clock signal Clk. The clock signal Clk is generated in the clock signal generation circuit CLK. The frequency of the clock signal Clk is selected from, for example, 200 kHz to 6 MHz. The period Tclk of the clock signal Clk is constant regardless of whether the load is light or heavy.

FIG. 6C shows the switching output signal Vsw output to the switching output signal Vsw. The signal waveforms and the periods Tsw1 and Tsw2 of the switching output signal Vsw differ between the time of light load KF and the time of heavy load JF. Specifically, the period Tsw1 at the time of light load KF is higher than that of the clock signal Clk. This indicates that the frequency of the switching output signal Vsw is lower than that of the clock signal Clk. The period Tsw2 of the switching output signal Vsw at the time of heavy load JF indicates that it is equal to the period Tclk of the clock signal Clk.

FIG. 6D shows the output voltage Vout output to the output terminal VOUT. The output voltage Vout has a ripple voltage component that varies slightly vertically with respect to the average level indicated by a broken line. The ripple voltage component is produced regardless of whether the load is light or heavy, and is produced according to the period of the switching output signal Vsw.

FIG. 6E shows the reverse current detection signal Zc output from the reverse current detection circuit ZC. At the time of light load KF, the reverse current detection signal Zc is produced according to the period of the switching output signal Vsw, and is low Lo in a period from time t1 to time t2 and is high Hi in a period from time t2 to time ts. The reverse current detection signal Zc is held low Lo in a period from time ts to time t8, that is, at the time of heavy load JF. Whether at the time of heavy load JF, the polarity of the reverse current detection signal Zc is set high Hi or low Lo is preferably selected as necessary by a circuit portion that is coupled to the stage preceding and the stage succeeding the reverse current detection circuit ZC.

FIGS. 6F, 6G, 6H and 6I respectively show signals produced at nodes N1, N2, N3 and N4 of the load determination circuit FH shown in FIG. 4. The signal at the node N1 shown in FIG. 6F is generated as a reset signal for the flip-flops FF1 to FF3 of the load determination circuit FH. In the embodiment of the present invention, the signal at the node N1 is the same as a signal that is obtained by inverting the polarity of the reverse current detection signal Zc. The polarity of the signal at the node N1 is set as necessary according to the type of circuit of the flip-flops FF1 to FF3.

The signal at the node N2 shown in FIG. 6G is produced at the Q bar output of the flip-flop FF1. The signal produced at the node N2 is a signal that is obtained by counting the PWM output signal Spwm. At the time of light load KF, the signal is low Lo, and at the time of heavy load JF, the signal is a signal that is obtained by halving the frequency of the clock signal Clk. In a period from time t3 to time t8, the signal is a signal that is obtained by halving the frequency of the clock signal Clk.

The signal at the node N3 shown in FIG. 6H is produced at the Q bar output of the flip-flop FF2. Since the signal produced at the node N3 is a signal that is obtained by dividing the frequency of the signal produced at the Q bar of the flip-flop FF1, at the time of light load KF, the signal remains low Lo, and at the time of heavy load JF, the signal is a signal that is obtained by halving the frequency of the signal at the node N2. The signal at the node N3 is turned from low Lo to high Hi at time t5, and this timing delays with respect to time t3 that is timing at which the signal at the node N2 rises.

The signal at the node N4 shown in FIG. 6I is a signal that is obtained by latching the high level Hi of the signal produced at the node N3. Hence, the high level Hi is held until the period from time t5 to time t8.

The PWM output signal Spwm shown in FIG. 6J is the pulse width modulation signal that is output from the PWM comparator Cpwm. With timing at which the error voltage Ve intersects the slope comparison voltage Vsle, the PWM output signal Spwm appears high Hi or low Lo, and the duty ratio of the pulse width is controlled at the time of light load KF and at the time of heavy load JF.

The load determination signal Vfh shown in FIG. 6K is output from the load determination circuit FH. In order for the load determination signal Vfb to be output with predetermined timing in a predetermined level, the polarity is set with the timing of various types of voltages or signals in FIGS. 6E to 6K. The load determination signal Vfh is a signal that is obtained by performing a NAND operation on the signal at the node N4 and the clock signal Clk which are input to the NAND circuit NAND of the load determination circuit FH. In the embodiment of the present invention, the polarity of the load determination signal Vfh is set high Hi at the time of light load KF. Even at the time of heavy load JF, the polarity is set to be held high Hi until the period from time ts to time t8. Specifically, although the load determination signal Vfh is held high Hi originally at the time of light load KF, even when the load RL enters the time of heavy load JF, the predetermined time is held in the same level as at the time of light load KF. This is because it is uniquely determined by the circuit configuration of the load determination circuit FH.

At the time of heavy load JF, the period from time ts to time t7 is set by the load determination circuit FH shown in FIG. 4. Specifically, the frequency of the PWM output signal Spwm is quartered by the flip-flops FF1 and FF2. At the time of heavy load JF, the period of the PWM output signal Spwm is equal to the period Tclk of the clock signal Clk. Hence, the period from time ts to time t7 is set to be approximately four times as long as the period Tclk of the clock signal Clk.

The period from time ts to time t7 is a standby time until the offset voltage generation circuit OFFSET is operated when the load RL is changed from the light load to the heavy load, and is prepared as the margin time. Since this margin time does not need to be provided, the operation of the offset voltage generation circuit OFFSET may be switched immediately after time ts. However, the setting of the margin time is useful for distinguishing between the definite change of the load RL and an erroneous operation caused by noise or the like. In other words, the margin time when the load is switched between the light load and the heavy load is useful for enhancing the accuracy of switching from the time of light load KF to the time of heavy load JF and switching from the time of heavy load JF to the time of light load KF.

FIGS. 7A to 7K show the results of a simulation on the signal waveforms at the main nodes of the switching regulator 100 shown in FIG. 1 and according to the present invention and the load determination circuit FH shown in FIG. 4. FIGS. 6A to 6K described previously show the state where the load is changed from the light load to the heavy load. FIGS. 7A to 7K schematically show the opposite case where the load is changed from the heavy load to the light load. As with FIGS. 6A to 6K, FIGS. 7A to 7K are broadly divided into two regions. FIGS. 7A to 7K will be described below with reference to FIGS. 1, 4 and 6A to 6K.

FIG. 7A shows the load current IRL used to distinguish between the time of light load and the time of heavy load. The magnitude of the load current IRL differs with respect to the boundary of time ts. A period from time t1 to time ts is the time of heavy load JF, and the load current IRL at that time is represented by the current ij. On the simulation, the current ij is 500 mA. A period from time ts to time t8 is the time of light load KF, and the current ik at that time is assumed to be zero on the simulation.

FIG. 7B shows the clock signal Clk. The clock signal Clk is generated in the clock signal generation circuit CLK. The frequency of the clock signal Clk is selected from, for example, 200 kHz to 6 MHz. The period Tclk of the clock signal Clk is constant regardless of whether the load is light or heavy.

FIG. 7C shows the switching output signal Vsw output to the switching output terminal VSW. The signal waveforms and the periods Tsw2 and Tsw1 of the switching output signal Vsw differ between the time of light load KF and the time of heavy load JF. Specifically, it is found that the period Tsw2 at the time of heavy load JF is equal to the period Tclk of the clock signal Clk whereas the period Tsw1 at the time of light load KF is greater than the period Tsw2.

FIG. 7D shows the output voltage Vout output to the output terminal VOUT. The output voltage Vout has a ripple voltage component that varies slightly vertically with respect to the average level indicated by a broken line. The ripple voltage component is produced regardless of whether the load is light or heavy.

FIG. 7E shows the reverse current detection signal Zc output from the reverse current detection circuit ZC. At the time of heavy load JF, the reverse current detection signal Zc is held low Lo. Whether at the time of heavy load JF, the polarity of the reverse current detection signal Zc is set low Lo or high Hi is set by the circuit portion that is coupled to the stage preceding and the stage succeeding the reverse current detection circuit ZC. The reverse current detection signal Zc at the time of light load KF is a pulse signal that repeats the low level Lo and the high level Hi according to the period of the switching output signal Vsw.

FIGS. 7F, 7G, 7H and 7I respectively show signals produced at nodes N1, N2, N3 and N4 of the load determination circuit FH shown in FIG. 4. The signal at the node N1 shown in FIG. 7F is generated as a reset signal for the flip-flops FF1 to FF3 of the load determination circuit FH. In the embodiment of the present invention, the signal at the node N1 is the same as a signal that is obtained by inverting the polarity of the reverse current detection signal Zc. The polarity of the signal at the node N1 is selected as necessary according to the type of circuit of the flip-flops FF1 to FF3.

The signal at the node N2 shown in FIG. 7G is produced at the Q bar output of the flip-flop FF1. The signal produced at the node N2 is a signal that is obtained by counting the PWM output signal Spwm. At the time of heavy load JF, the signal is a signal that is obtained by halving the frequency of the clock signal Clk, and at the time of light load KF, in a period from time t7 to time t8, the high level Hi is held.

The signal at the node N3 shown in FIG. 7H is produced at the Q bar output of the flip-flop FF2. Since the signal produced at the node N3 is a signal that is obtained by dividing the frequency of the signal produced at the Q bar of the flip-flop FF1, at the time of heavy load JF, the signal is a signal that is obtained by halving the frequency of the signal at the node N2, and at the time of light load KF, after time t7, the high level Hi is held.

At the time of heavy load JF, the signal at the node N4 shown in FIG. 7I is the same as a signal that is obtained by latching the high level Hi of the signal produced at the node N3, and at the time of light load KF, the low level Lo is held.

The PWM output signal Spwm shown in FIG. 7J is the pulse width modulation signal that is output from the PWM comparator Cpwm. With timing at which the error voltage Ve intersects the slope comparison voltage Vsle, the PWM output signal Spwm appears high Hi or low Lo, and the duty ratio of the pulse width is controlled at the time of light load KF and at the time of heavy load JF. With the timing at which the error voltage Ve intersects the slope comparison voltage Vsle, the PWM output signal Spwm is taken out to the output side of the PWM comparator Cpwm as the PWM output signal.

The load determination signal Vfh shown in FIG. 7K is output from the load determination circuit FH. The load determination signal Vfh is a signal that is obtained by performing a NAND operation on the signal at the node N4 and the clock signal Clk which are input to the NAND circuit NAND of the load determination circuit FH. With respect to the polarity of the load determination signal Vfh, at the time of heavy load JF, that is, in the period from time t1 to time ts, the clock signal Clk is output, and at the time of light load KF, after time t6, it is turned high Hi. Hence, after time t6, the offset voltage generation circuit OFFSET is constantly on.

As shown in FIG. 7K, the load determination signal Vfh when the load RL is changed from the time of heavy load to the time of light load is controlled so as to be switched to the high level Hi from the clock signal Clk. In this way, at the time of heavy load, the offset voltage generation circuit OFFSET is turned on and off by the clock signal Clk whereas at the time of light load, the offset voltage generation circuit OFFSET is constantly on. By this type of control method, the offset voltage applied to the PWM comparator Cpwm is made to differ between the time of heavy load and the time of light load, with the result that the responsiveness of the entire switching regulator 100 and the stability of the output voltage Vout are acquired.

As shown in FIG. 7K. when the load RL is changed from the time of heavy load JF at time ts, the load determination signal Vfh is switched not simultaneously at time ts but at time t6. Hence, the margin time when the load is changed from the time of heavy load JF to the time of light load KF is a period from time ts to time t6, and is substantially equal to the period Tclk of the clock signal Clk. It is found that this margin time is shorter than the margin time described previously with reference to FIG. 6. A difference is made between both the margin times because the timing at which the PWM output signal Spwm, the reverse current detection signal Zc, the signal at the node N4 and the clock signal Clk input to the load determination circuit FH shown in FIG. 4 are turned on and off and the logic operation of the NAND circuit NAND are involved.

Figure 8:
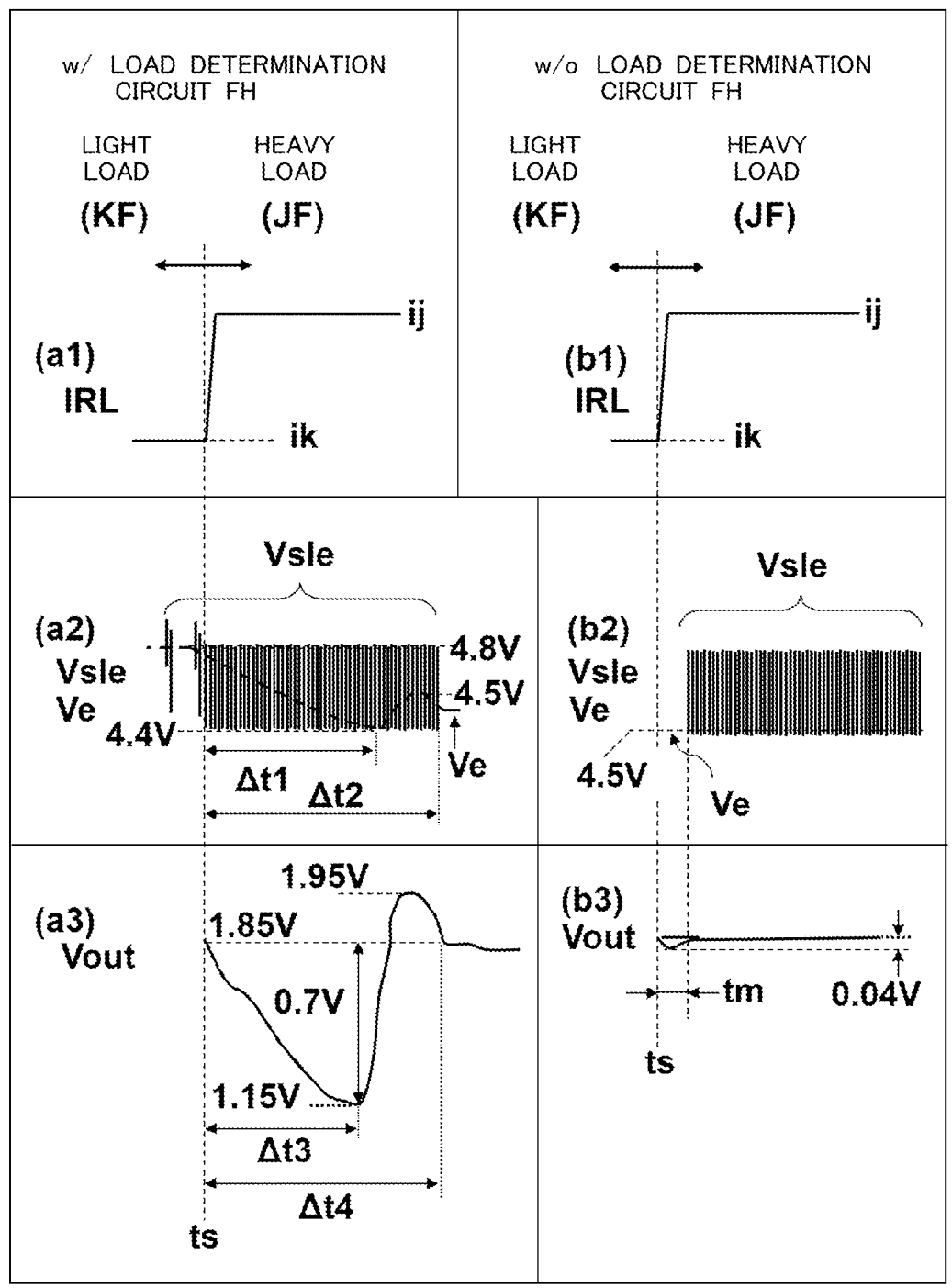
FIG. 8 A comparison signal waveform diagram for illustrating the difference of signal waveforms at main modes when the load is transferred from the light load to the heavy load or from the heavy load to the light load between a case where the load determination circuit of the present invention is adopted and a case where the load determination circuit is not adopted.

FIG. 8 shows the results of a simulation on the comparison of transition of the voltage applied to the PWM comparator Cpwm when the load RL is switched from the light load to the heavy load, the signal and the output voltage Vout output to the output terminal VOUT between the case where the load determination circuit FH is adopted and the case where the load determination circuit FH is not adopted. The (a1) section to (a3) section of FIG. 8 show the case where the load determination circuit FH is not adopted, and the (b1) section to (b3) section of FIG. 8 show the case where the load determination circuit FH is adopted. Both the cases will be described below with reference to FIG. 1.

The (a1) section of FIG. 8 shows the load current IRL flowing through the load RL when the load determination circuit FH is not adopted. The currents ik and ij are currents flowing through the load RL at the time of light load and at the time of heavy load, respectively. It is assumed that on the simulation, the current ik is zero, and that the current ij is 500 mA. The (a1) section of FIG. 8 schematically shows a state where at time t1, the magnitude of the load is rapidly switched from the light load to the heavy load or from the heavy load to the light load. It shows the state where here, the load current IRL is rapidly switched from the current ik to the current ij or from the current ij to the current ik.

The (a2) section of FIG. 8 shows the error voltage Ve and the slope comparison voltage Vsle applied to the two input terminals of the PWM comparator Cpwm. Although when the load RL is switched from the light load to the heavy load at time ts, the voltage level of the error voltage Ve is about 4.8 V at the time of light load, the voltage level at the time when a time $\Delta t1$ has elapsed since time ts after the switching to the heavy load is significantly lowered to 4.4 V, thereafter the voltage level is slightly increased and the voltage level at the time when a time $\Delta t2$ has elapsed since time ts is substantially stabilized at 4.5 V. It is shown that the error voltage Ve shown in the (a2) section of FIG. 8 is significantly varied when the load is switched from the time of light load to the time of heavy load.

As shown in the (a2) section of FIG. 8, the upper limit value and the lower limit value of the slope comparison voltage Vsle differ slightly between the time of light load and the time of heavy load, and although its period is relatively rough at the time of light load, that is, its frequency is lowered, the period at the time of heavy load is constant, and the period here is equal to that of the clock signal Clk.

The (a3) section of FIG. 8 shows the output voltage Vout output to the output terminal VOUT. The output voltage Vout is significantly varied so as to follow the error voltage Ve shown in the (a2) section of FIG. 8. The level of the output voltage Vout is changed as follows: although the level of the output voltage Vout is about 1.85 V at the time of light load, when a time $\Delta t3$ of 16 μs has elapsed since time ts when the load is switched from the light load to the heavy load, the output voltage Vout is 1.15 V by being lowered by 0.7 V as compared with the time of light load, thereafter the output voltage Vout is continuously increased to about 1.95 V exceeding the 1.85 V at the time of light load, is thereafter rapidly lowered after a time $\Delta t4$ of 30 μs has elapsed since time t1 and is finally stabilized in the same level as 1.85 V at the time of light load. Since the maximum variation amount of the output voltage Vout varies from 1.85 V to 1.15 V, the rate of variation is about 40%, which is significantly high. This type of event means that when the load state is switched from the time of light load to the time of heavy load, a failure occurs in the responsiveness and the stability of the switching regulator 100.

The (b1) section of FIG. 8 shows the load current IRL flowing through the load RL when the load determination circuit FH is adopted. The currents ik and ij are currents flowing through the load RL at the time of light load and at the time of heavy load, respectively. It is assumed that on the simulation, the current ik is zero, and that the current ij is 500 mA. These conditions are the same as those in the case where the load determination circuit FH shown in the (a1) section to (a3) section of FIG. 8, is not adopted. The (b1) section of FIG. 8 is exactly the same as the (a1) section of FIG. 8, and schematically shows a state where at time ts, the magnitude of the load is rapidly switched from the light load to the heavy load or from the heavy load to the light load. Here, the load current IRL is rapidly switched from the current ik to the current ij or from the current ij to the current ik.

The (b2) section of FIG. 8 shows the error voltage Ve and the slope comparison voltage Vsle applied to the two input terminals of the PWM comparator Cpwm. When the load RL is switched from the light load to the heavy load at time ts, the voltage level of the error voltage Ve is about 4.5 V regardless of whether the load is the light load or the heavy load. This state significantly differs from the transition of the voltage level of the error voltage Ve shown in the (a2) section of FIG. 7. The slope comparison voltage Vsle is produced the margin time tm behind time ts. The margin time tm is set by the flip-flops FF1 to FF3 of the load determination circuit FH.

The (b3) section of FIG. 8 shows the output voltage Vout output to the output terminal VOUT. It can be confirmed that the output voltage Vout is lowered by about 0.04 V during the margin time tm of about 4 μs, and is thereafter returned to the voltage level at the time of light load instantaneously.

Although the (b1) section to (b3) section of FIG. 8 show the characteristics of the load determination circuit FH, as is clear from comparison with the (a1) section to (a3) section of FIG. 8 showing the characteristics obtained when it is not adopted, the variation amount and the variation time of the output voltage Vout are 0.04 V and 4 μs, respectively, and are values lower than 0.7 V and 30 μs obtained when the load determination circuit FH is not adopted, with the result that it is found that the responsiveness of the switching regulator 100 and the stability of the output voltage Vout are enhanced.

Figure 9:
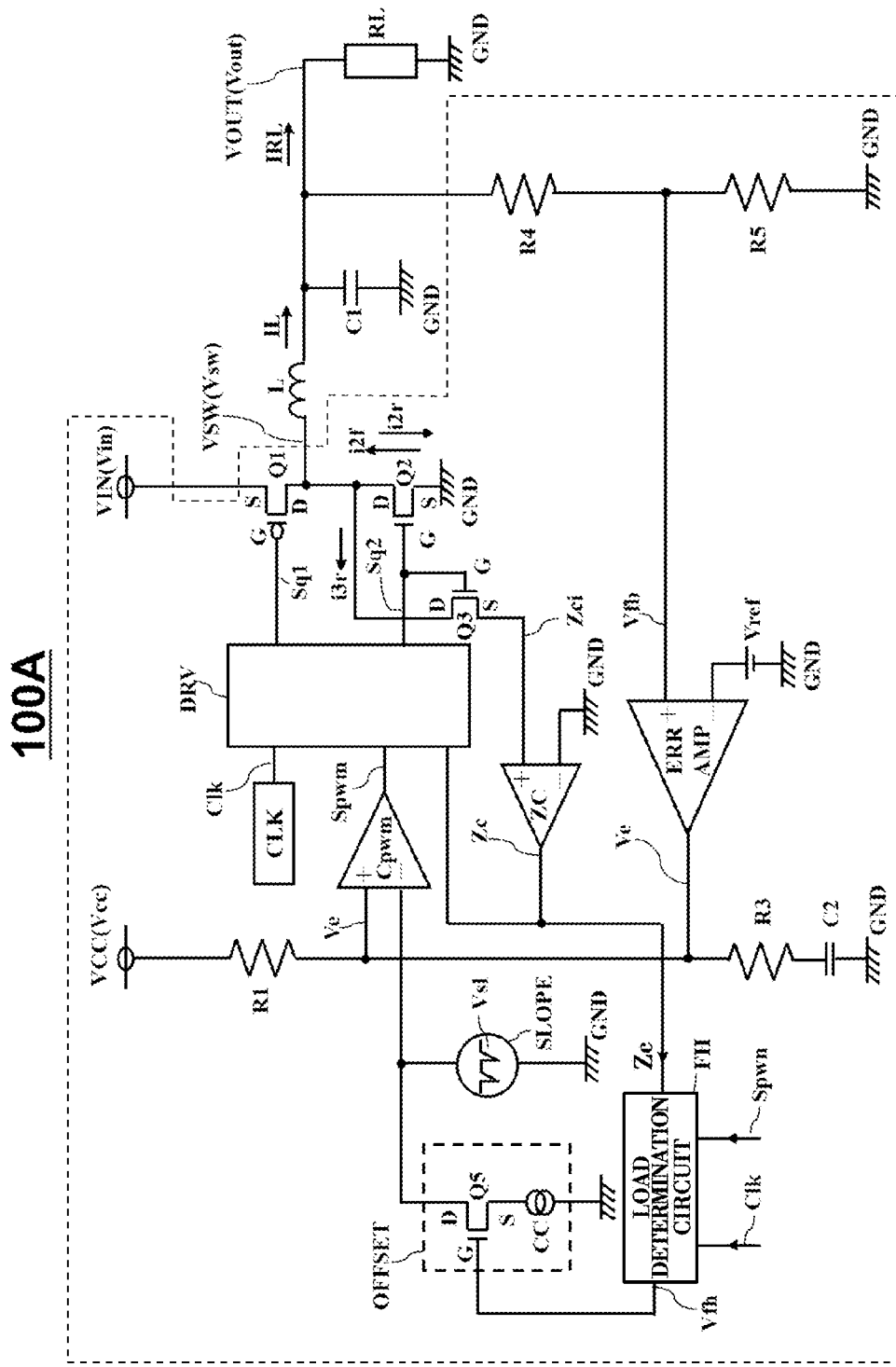
FIG. 9 A circuit diagram showing another switching regulator according to the present invention.

FIG. 9 shows another switching regulator 100A according to the present invention. Although the switching regulator 100 shown in FIG. 1 includes the switching signal feedback transistor Q4 and the resistor R2, the switching regulator 100A differs in that it does not include these circuit elements. The switching regulator 100 shown in FIG. 1 is a so-called current mode system, and the switching regulator 100A shown in FIG. 9 is a voltage mode system. For this reason, the switching signal feedback transistor Q4 and the resistor R2 are not provided. Except these circuit elements, the switching regulator 100A includes all the circuit elements shown in FIG. 1. Even in the switching regulator 100A of the voltage mode system shown in FIG. 9, the load determination circuit FH, the reverse current detection circuit ZC and the offset voltage generation circuit OFFSET according to the present invention are adopted, and thus the same effects as in the switching regulator of the current mode system shown in FIG. 1 are provided.

Constituent elements surrounded by broken lines in FIG. 9 are preferably formed into an IC. However, the resistors R4 and R5 may be connected externally to the IC.

As described above, in the present invention, the switching regulator detects that the load is placed in the light load state or the heavy load state, further detects that the light load state or the heavy load state continues for a predetermined time and applies an offset to the slope voltage, with the result that it is possible to achieve both responsiveness and stability at the time of light load and at the time of heavy load.

Since the switching regulator of the present invention can hold the desired characteristics of both the responsiveness and the stability when the load is changed from the light load to the heavy load or from the heavy load to the light load, its industrial applicability is significantly high.

Although in the above discussion, the preferred embodiment of the present invention has been described, variations of the invention disclosed are possible by various methods, and it is obvious to the person skilled in the art that various embodiments different from the specific configurations described above are possible. Hence, the following claims are intended to include any variations of the present invention in the technical scope without departing from the spirit and the technical view of the present invention.

What is claimed is:

1. A switching regulator comprising:
    a first switching transistor to which an input voltage is fed and which performs an on/off switching operation;
    a second switching transistor which performs an on/off operation complementarily with the first switching transistor;
    a driver which generates a first drive pulse and a second drive pulse that respectively drive the first switching transistor and the second switching transistor in synchronization with a clock signal;
    a PWM comparator which adjusts a pulse width of the first drive pulse and the second drive pulse to feed a pulse width modulation signal to the driver;
    a reverse current detection circuit which detects a current flowing through the second switching transistor;
    a load determination circuit which is controlled by an output of the reverse current detection circuit; and
    an offset voltage generation circuit which is controlled by an output of the load determination circuit to correct a potential of one input terminal of the PWM comparator.

2. The switching regulator according to claim 1,
    wherein the load determination circuit includes:
    a flip-flop which receives the pulse width modulation signal as an input signal and which is reset by a reverse current detection signal output from the reverse current detection circuit; and
    a logic operation circuit which performs a logic operation on an output of the flip-flop and the clock signal.

3. The switching regulator according to claim 2,
    wherein when a revere current detection transistor is turned on, the logic operation circuit makes the reverse current detection circuit turn on the offset voltage generation circuit whereas when the revere current detection transistor is turned off, the logic operation circuit uses the clock signal to turn on and off the offset voltage generation circuit.

4. The switching regulator according to claim 2,
    wherein the flip-flop is formed with at least one stage of D flip-flop.

5. The switching regulator according to claim 1, wherein the offset voltage generation circuit includes a constant current circuit.

6. The switching regulator according to claim 1, wherein when the reverse current detection circuit detects that the current flowing through the second switching transistor flows in a direction opposite to a normal direction, the reverse current detection circuit turns off the second switching transistor.

7. The switching regulator according to claim 1, further comprising:
an inductor which is coupled to a common connection point of the first switching transistor and the second switching transistor;
a capacitor which is connected in series to the inductor;
an output terminal which is provided at a common connection point of the inductor and the capacitor;
a voltage-dividing circuit which is connected to the output terminal and which divides an output voltage produced at the output terminal;
an error amplifier in which a feedback voltage generated by the voltage-dividing circuit is applied to one input terminal and a reference voltage is applied to the other input terminal; and
an error voltage application portion which applies an error voltage output from the error amplifier to the other input terminal of the PWM comparator.

8. The switching regulator according to claim 7, further comprising:
a switching signal feedback transistor which is coupled to the one input terminal of the PWM comparator and which feeds back a switching output signal produced at the switching output terminal in synchronization with the first switching transistor.

* * * * *